United States Patent [19]

Furuya et al.

[11] Patent Number: 4,888,767
[45] Date of Patent: Dec. 19, 1989

[54] REPEAT REQUEST SIGNAL TRANSMISSION METHOD FOR MULTI-STATION PACKET COMMUNICATION

[75] Inventors: Yukitsuna Furuya; Fumio Akashi, both of Tokyo, Japan

[73] Assignee: NEC Corporation, Japan

[21] Appl. No.: 217,090

[22] Filed: Jul. 7, 1988

Related U.S. Application Data

[63] Continuation of Ser. No. 812,979, Dec. 24, 1985, abandoned.

[30] Foreign Application Priority Data

Dec. 25, 1984 [JP] Japan .............................. 59-278053
Dec. 26, 1984 [JP] Japan .............................. 59-277293
Mar. 22, 1985 [JP] Japan .............................. 60-56052

[51] Int. Cl.$^4$ .............................................. H04J 3/16
[52] U.S. Cl. .................................... 370/95.2; 370/60; 370/94.1
[58] Field of Search ............... 370/110.1, 96, 124, 370/69.1, 104, 94, 60, 17; 371/4.5, 32, 33, 45; 455/67; 340/825.5

[56] References Cited

U.S. PATENT DOCUMENTS

| | | | |
|---|---|---|---|
| 4,376,278 | 3/1983 | Jacobsthal | 370/13 |
| 4,397,020 | 8/1983 | Howson | 370/13 |
| 4,507,782 | 3/1985 | Kunimasa et al. | 370/60 |
| 4,542,507 | 9/1985 | Read | 370/13 |
| 4,617,657 | 10/1986 | Drynan et al. | 370/60 |

OTHER PUBLICATIONS

IEEE Transactions on Communications, vol. COM-29, No. 11, 11/81, "A Broadcast Protocol for File Transfers to Multiple Sites".
IEEE Transactions on Communications, vol. COM-32, No. 6, 6/84, "An Improved Broadcast Retransmission Protocol".

*Primary Examiner*—Douglas W. Olms
*Assistant Examiner*—Curtis Kuntz
*Attorney, Agent, or Firm*—Laff, Whitesel, Conte & Saret

[57] ABSTRACT

In a network wherein all the receive stations connected to a radio link or a bus type wire link are capable of observing information which is being transmitted over the link, a method of allowing each receive station to send back a repeat request signal in multi-station packet communication in which a single transmit station transmits the same message to a plurality of receive stations. The same number of frequencies as packets are used so that a sinusoidal wave having a particular one of the frequencies which is associated with a packet with an error is sent. Alternatively, the same number of time slots as packets are set up so that a burst signal is sent as a repeat request signal in a particular one of the time sots which is associated with information on a packet with an error. Utilizing the fact that the signals to be sent are repeat request signals, the method insures accurate delivery of retransmit request information to the transmit station even if repeat request signals sent back at the same time are in a conflict.

7 Claims, 8 Drawing Sheets

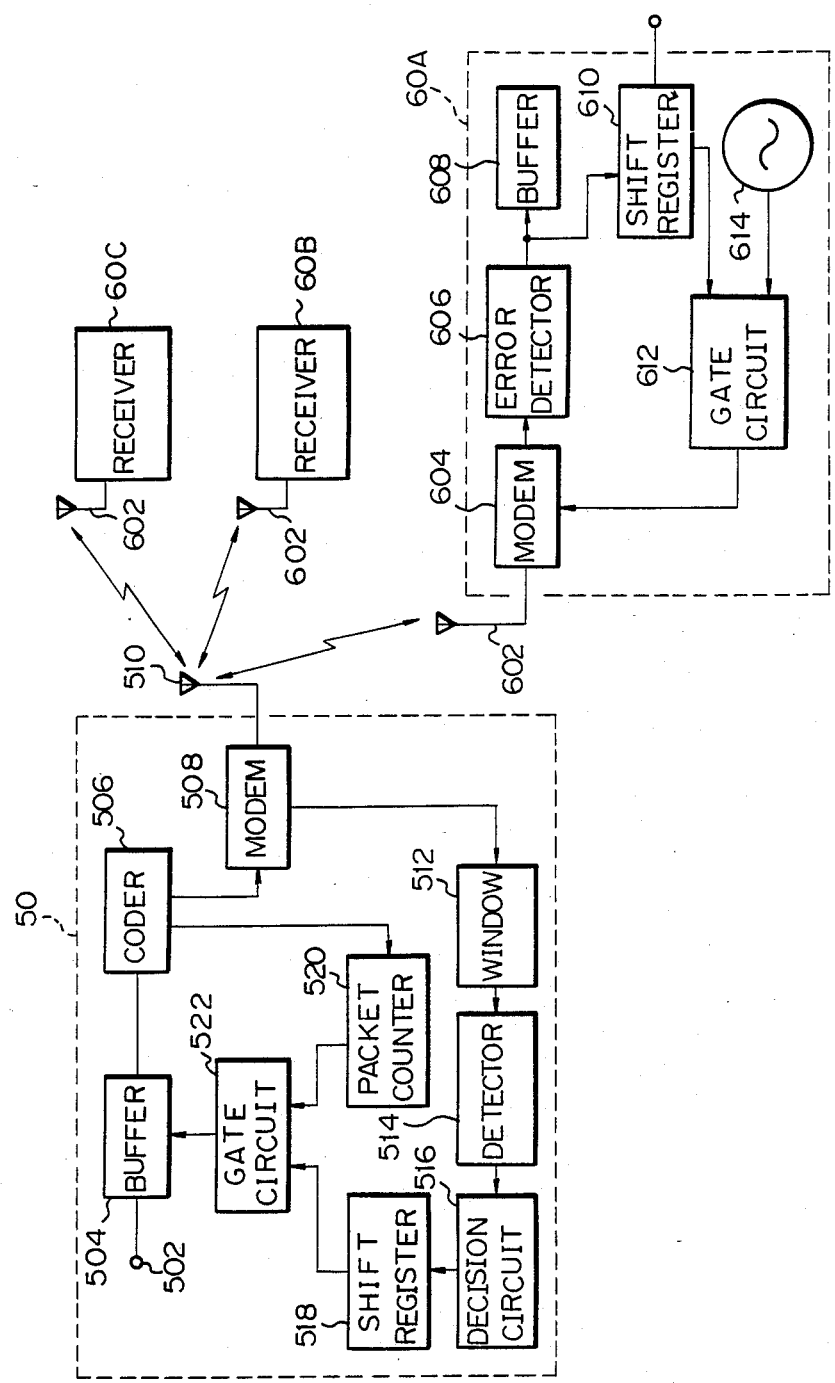

REPEAT REQUEST SIGNAL TRANSMISSION METHOD FOR MULTI-STATION PACKET COMMUNICATION

This application is a continuation of application Ser. No. 812,979 filed Dec. 24, 1985 now abandoned.

BACKGROUND OF THE INVENTION

The present invention relates to multi-station packet communication in which a single transmit station sends the same message to a plurality of receive stations and, more particularly, to a packet repeat request signal transmitting method for a network in which all the receive stations connected to a radio link or a bus type wire link are capable of observing information which is being transmitted over the link.

Multi-station communication in a radio link, a bus type wire link and other networks has the outstanding capability for delivering information to all the receive stations in the network by a single communication because all the receive stations are capable of observing the same information. However, the problem with multi-station communication is that when a plurality of receive stations respond with repeat requests, or retransmission requests, at the same time due to transmission errors, the repeat request signals conflict with each other in the link. As a result, repeat requests cannot be correctly sent back to a transmit station.

The occurrence of a conflict particular to a situation wherein a plurality of receive stations share the same communication link is well known in the art as a problem with multi-access.

Multi-access systems may generally be classified into two types, i.e., a transmission right control system which sequentially assigns a transmission right to all the receive stations, and a random access type which in the event of a conflict detects it and retransmits information after a suitable delay time. Although the transmission right control type system is free from conflicts, it needs to exchange some information for controlling the repeat request signal returning timings among receive stations, resulting in a complicated control. An example of retransmission protocol of this kind is disclosed in S. B. Calo and M. C. Easton "A Broadcast Protocol for File Transfers to Multiple Sites", IEEE Transactions of Communications, Vol. COM-29, No. 11, November 1981, pages 1701-1707. The technique disclosed in this paper is such that a transmit station sends N packets and each transmit station sends an ACK frame back to the transmit station to report whether it successfully received the N packets without error (CYCLE 1) and, thereafter, the transmit station retransmits packets based on the returned ACK frames (CYCLE 2). Such a procedure is repeated until all the packets have been transmitted. This ACK frame scheme, however, brings about another problem that a disproportionate period of time is necessary for all the packets to be successfully transmitted. Also, the time necessary for transmitting a repeat request signal becomes considerably long if the number of receive stations is great. In addition, since receive stations for which a multi-station communication is meant are usually changed at each communication, the control over the returning timings among the receive stations becomes further complicated. The random access type system, on the other hand, involves a considerable probability of conflict which limits the efficiency, because repeat request signals in most cases are generated at the same time by a plurality of receive stations.

SUMMARY OF THE INVENTION

It is therefore an object of the present invention to eliminate the drawbacks inherent in the prior art systems and provide a simple and efficient repeat request signal transmitting method for multi-station packet communication.

It is another object of the present invention to provide a generally improved repeat request signal transmitting method for multi-station packet communication.

In one aspect of the present invention, in a repeat request signal transmitting method for multi-station packet communication in which a same message is transmitted from a single transmit station to a plurality of receive stations, each of the receive stations checks more than one received packets for error and sends back to the transmit station a repeat request signal which comprises a signal having a particular frequency associated with information on a packet in which an error is detected, while the transmit stations senses energy of respective frequency components of the signals which are sent from the receive stations and determines packets to retransmit in correspondence with the frequencies the sensed energy of which is greater than a predetermined value.

In another aspect of the present invention, in a repeat request signal transmitting method for multi-station packet communication in which a single transmit station transmits a same message to a plurality of receive stations, each of the receive stations checks more than one received packets for error and sends back to the transmit station a repeat request signal which comprises a burst signal appearing in a particular time slot which is associated with information on a packet in which an error is detected, while the transmit station senses energy of each of the bursts of the signals sent from the receive stations and determines packets to retransmit in correspondence with the time slots of the bursts in which energy greater than a predetermined value sensed.

In another aspect of the present invention, a repeat request signal transmitting method for multi-station packet communication in which a single transmit station transmits a same message to a plurality of receive stations, each of the receive stations determines a number of packets which are received with errors in a binary code and sends back to the transmit station the binary code, which is obtained after reception of a predetermined number of packets, each bit in a time slot which is different from the other bits, while the transmit station senses energy of bursts which are sent from the receive stations and appear in the respective time slots to recognize a number of check packets which the receive stations need for error correction and retransmits check packets based on the recognized number of check packets.

The above and other objects, features and advantages of the present invention will become more apparent from the following detailed description taken with the accompanying drawings.

BRIEF DESCRIPTION OF THE DRAWINGS

FIG. 6 is a block diagram showing a third embodiment of the present invention;

DESCRIPTION OF THE PREFERRED EMBODIMENTS

Figure 1:
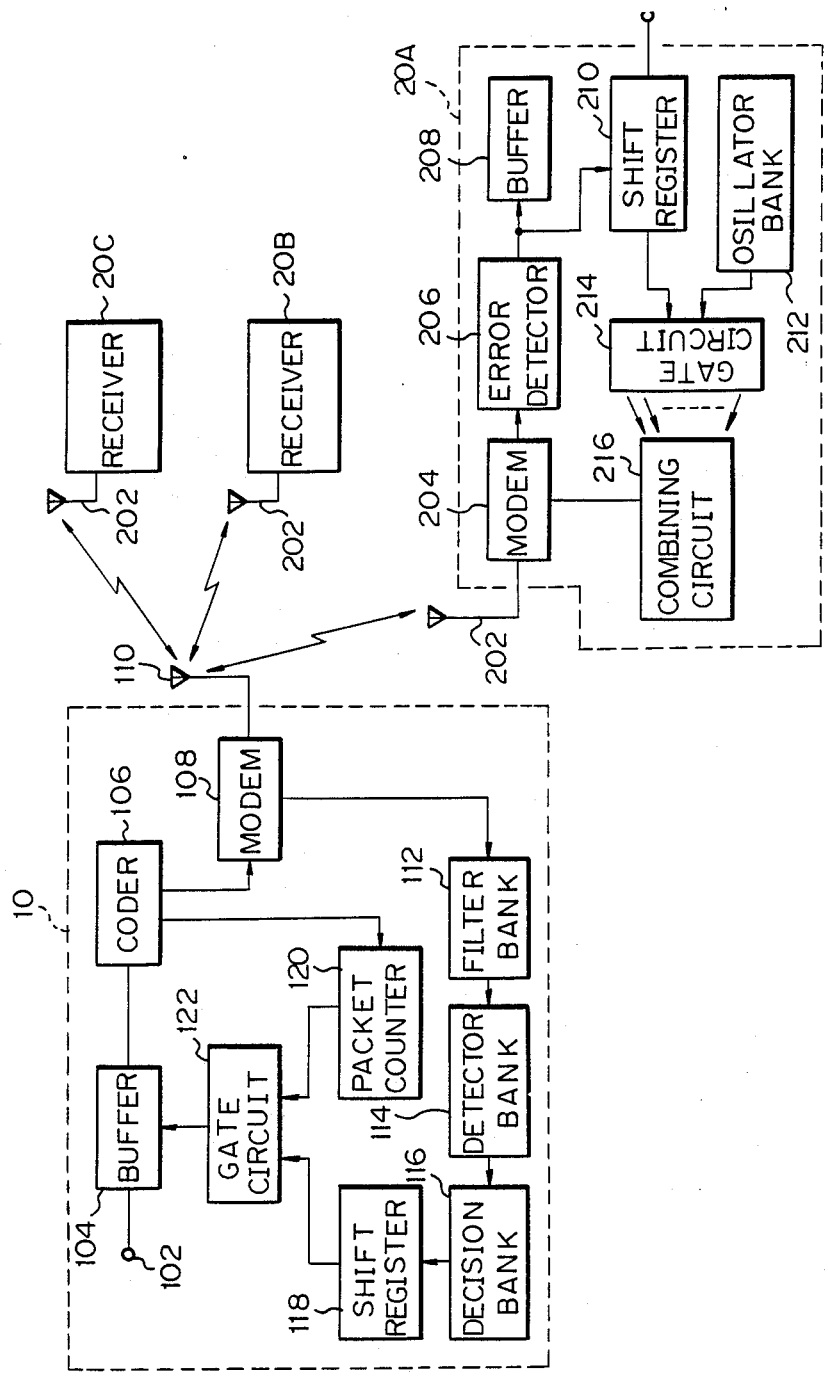
FIG. 1 is a block diagram representative of a first embodiment of the present invention.

While the repeat request signal transmitting method for multi-station packet communication of the present invention is susceptible of numerous physical embodiments, depending upon the environment and requirements of use, substantial numbers of the herein shown and described embodiments have been made, tested and used, and all have performed in an eminently sastisfactory manner.

FIRST AND SECOND EMBODIMENTS

The principle underlying a first and a second embodiments of the present invention will be described first. Briefly, utilizing the fact that the signals to be transmitted are repeat request signals, the method in accordance with any of the first and second embodiments allows repeat request information to be correctly delivered from a plurality of receive stations to a transmit station even if the repeat request signals conflict with each other due to simultaneous generation. Specifically, where receive stations simply code packet numbers which are assigned to faulty packets and return them to a transmit station, the transit station fails to correctly recognize the faulty packet numbers particular to the respective receive stations in the event of a conflict. In accordance with the first and second embodiments, the same number of discrete frequencies as the packets are prepared so that a sinusoidal wave having a particular one of the frequencies which is associated with any faulty packet may be sent back, where information on packets are implemented with packet numbers. Some signal if not without interference will necessarily be observed in a frequency associated with a packet number of a packet which was received with an error by more that one receive stations, while no signal will be observed in frequencies associated with packet numbers of packets which were successfully received by all the receive stations. Therefore, repeat request from all the receive stations will be fulfilled if the transmit station is constructed to observe received energy in the respective frequency bands and retransmit only those packets with packet numbers associated with frequency bands in which energy greater than a predetermined level has been observed.

The packet-by-packet repeat request signal transmission effected by the receive stations as described above is not limitative. Alternatively, an arrangement may be made such that the number of faulty packets received by each receive station is sent back as information on faulty packets, while a transmit station sends to the receive stations packets which correspond to the number of faulty packets in the form of check bits, which are produced by error-correction-coding data signals. In this case, each of the receive stations discards faulty packets and decodes information using retransmitted check packets, the transmit station therefore needing no information showing which packets are faulty. This kind of transmitting method, too, may match different numbers of faulty packets to different frequencies in order to enhance efficient transmission of repeat request signals as in the previously stated method.

The first embodiment will be described in detail referring to FIGS. 1 and 2. In this particular embodiment, assume that a relatively long message such as a facsimile signal is transmitted in a plurality of discrete packets.

In a transmit station 10, information coming in through an input terminal 102 is once stored in a buffer 104. A coder 106 adds error detection codes to the information which is sequentially read out of the buffer 104. A modem 108 modulates the output of the coder 106 and sends it through an antenna 110.

Receivers 20A–20C receive the information at the same time. All the receivers 20A–20C are identical in construction and, therefore, the following description will concentrate to the receiver 20A by way of example. As packets are received through an antenna 202 of the receiver 20A, they are demodulated by a modem 204 and, then, checked for error packet by packet by an error detector 206. The received packets are stored in a buffer 208. At the same time, results of decision showing whether the discrete packets have been received without failure are sequentially applied from the error detector 206 to a shift register 210. When all the packets have been received, information on the respective packets concerning errors have been loaded in the shift register 210. Assuming that N packets are received, the shift register 210 has N shift stages. An oscillator bank 212 has N oscillators which oscillate different frequencies. The outputs of the oscillators in the bank 212 are selectively gated by a gate circuit 214 based on the information stored in the shift register 210. Specifically, only those oscillator output frequencies which are associated with faulty received packets appear at an output terminal of the gate circuit 214. The outputs of the gate 214 are combined by a combining circuit 216 which comprises an analog adder. The output of the combining circuit 216 is modulated by the modem 204 and, then, transmitted through the antenna 202 as a repeat request signal.

Assume that four packets are received, N=4, and that an error has been found in the first and third packets in the receive station 20A, in the third packet in the receive station 20B, and in the fourth packet in the receive station 20C. Shown in FIG. 2 are signals which are sent back as repeat request signals from the respective receive stations 20A–20C and their relationship in a link. In FIG. 2, frequencies $f_1$, $f_2$, $f_3$ and $f_4$ are assigned to the repeat request signals which respectively are associated with the first, second, third and fourth packets. In this particular example, the receivers 20A–20C respectively generate repeat request signals having frequencies which are shown in R20a, R20b and R20c of FIG. 2.

Figure 2:
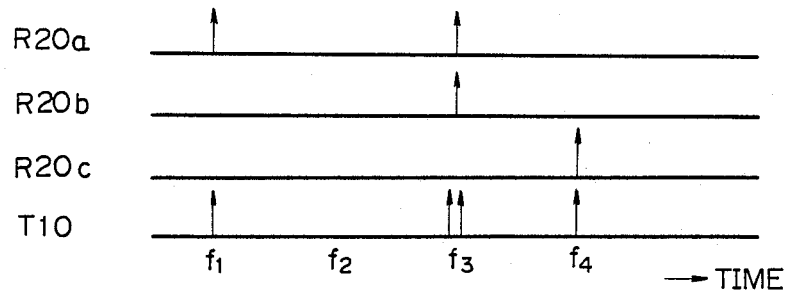
FIG. 2 shows frequencies which are assigned to repeat request signals in accordance with the embodiment of FIG. 1.

The transmit station 10 receives a signal T10 shown in FIG. 2 through the antenna 110. The modem 108 demodulates the received signal and applies its output to a filter bank 112, which comprises N filters. In the example shown in FIG. 2, the filter bank 112 comprises four filters which respectively are designed to pass the four frequencies $f_1$, $f_2$, $f_3$ and $f_4$. The outputs of the filter bank 112 are routed to a detector bank 114. By envelope detection, the detector bank 114 detects power of the respective filter outputs by envelope detectors and, thereby, senses energy of each of the filter outputs. The outputs of the detector bank 114 are applied to a decision bank 116 which then decides that, when the output of any of the detectors is above a predetermined level, a retransmission of a packet associated with it has been requested. In the example of FIG. 2, a retransmission of the first, third and fourth packets are requested. The results of such decision are stored in the shift register 118. A gate circuit 122 gates outputs of a packet counter 120, which are representative of addresses of the buffer 104, thereby causing only the requested packets to be retransmitted. Then, each of the receive stations 20A–20C checks only a necessary one or ones of the retransmitted packets for error and, if found any faulty packet, then returns another repeat request signal to the transmit station 10. In this manner, all the information can be delivered without failure.

Figure 4:
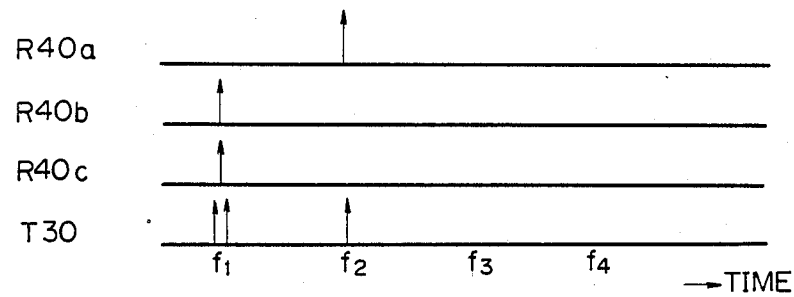
FIG. 4 shows frequencies assigned to repeat request signals in accordance with the embodiment of FIG. 3.
Figure 3:
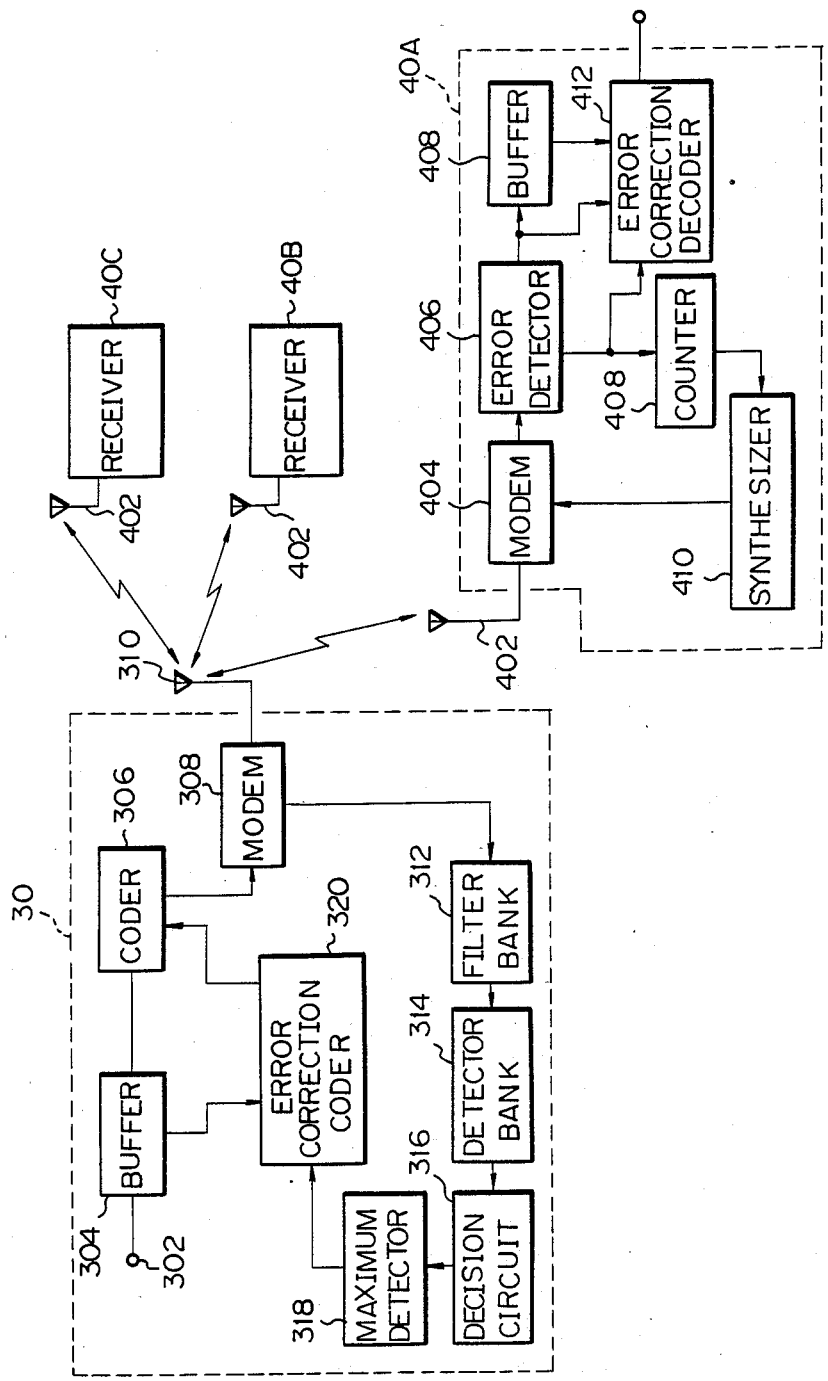
FIG. 3 is a block diagram showing a second embodiment of the present invention.

Referring to FIGS. 3 and 4, the second embodiment of the present invention is shown. In a transmit station 30, information inputted through an input terminal 302 is once stored in a buffer 304. A coder 306 adds error detection codes to the information which is sequentially read out of the buffer 304. A modem 308 modulates the output of the coder 306 and then transmits its output through an antenna 310.

Receive stations 40A–40C receive the information from the transmit station 30 at the same time. Again, the receive stations 40A–40C are identical in construction and, therefore, the operation will be described concentrating to the receive station 40A only. Packets received through an antenna 402 are demodulated by a modem 404 and, then, checked for error by an error detector 406. The received packets are stored in a buffer 408. The error detector 406 produces a result of decision which shows whether each of the packets has been received without failure, while a counter 408 counts faulty packets. In this particular embodiment, after all the packets have been received, the content of the counter 408, i.e., the number of faulty packets is returned as information. Specifically, the output terminal of the counter 408 is connected to a frequency control terminal of a synthesizer 410 so that frequencies associated with the content of the counter 408 are applied from the synthesizer 410 to the modem 404. The modulated output of the modem 404 is sent to the transmit station 30.

Assume that the same errors as those in the first embodiment have been detected in the respective receive stations 40A–40C. In FIG. 4, frequencies $f_1$, $f_2$, $f_3$ and $f_4$ are assigned to repeat request signals which are associated with one faulty packet, two faulty packets, three faulty packets, and four faulty packets, respectively. In the transmit station, the received signals are demodulated by the modem 308 and then applied to a filter bank 312, which comprises N filters. In the example shown in FIG. 4, the filter bank 312 comprises four filters. Each of the filters is designed to pass a particular one of the frequencies $f_1$, $f_2$, $f_3$ and $f_4$ therethrough. The outputs of the filter bank 312 are routed to a detector bank 314. The detector bank 314 subjects the respective filter outputs to envelope detection to extract their low frequency components and, thereby, detect energy of each filter output. The outputs of the detector bank 314 are applied to a decision bank 316. When the output of any of detectors in the bank 314 has exceeded a predetermined level, the decision bank 316 decides that packets corresponding in number to those particular detector outputs are faulty. A maximum detector 318 to which an output of the decision bank 316 is applied functions to discriminate one of the detected frequencies which is indicative of the largest number of packet errors. In the example shown in FIG. 4, the maximum detector 318 detects the frequency $f_2$ as such a particular frequency and determines that the largest number of faulty packets is two.

In the second embodiment, the transmit station 30 responsive to an output of the maximum detector 318 applies error correction coding to the information stored in the buffer 304 and transmits the redundant bits as packets. The number of redundant packets corresponds to that of the faulty packets. An example of such technique is disclosed in John J. Metzner "An Improved Broadcast Retransmission Protocol", IEEE Transaction of Communications, Vol. COM-32, No. 6, June 1984, pages 679–683. The disclosed technique will be outlined with reference to FIG. 5.

Figure 5:
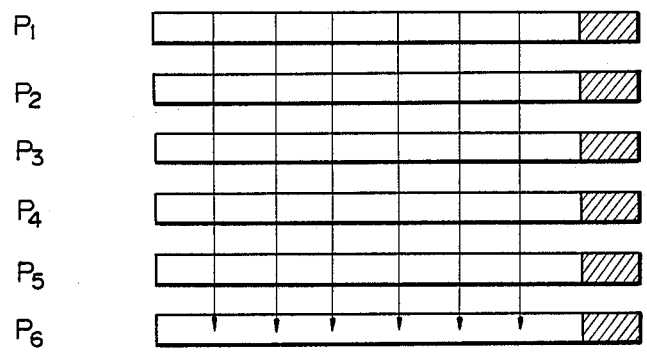
FIG. 5 is a diagram demonstrating the operation of the embodiment of FIG. 3.

In the example shown in FIG. 5, designated by symbols $P_1$–$P_4$ are packets which have already been transmitted. Each of the packets $P_1$–$P_4$ includes check bits for error detection. An error correction coder 320 (see FIG. 3) reads already transmitted data out of the buffer 304 and, then, codes them in a direction indicated by arrows in FIG. 5 to provide error correction codes. In this condition, data stored in packets $P_5$ and $P_6$ shown in FIG. 5 serve as check bits for the information packets $P_1$–$P_4$ which are associated in position therewith. Each of the receive stations 40A–40C, therefore, is allowed to correct faulty packets using the packets $P_5$ and $P_6$ which it receives. The information which the transmit station need be supplied is not which packet or packets have been faulty but how many packets have been received with errors by the receive stations.

The coder 306 adds error correction codes to the output of the error correction coder 320. The output of the coder 306 is modulated by the modem 308 and then transmitted through the antenna 310. In the receive station 40A, the modem 404 demodulates the retransmitted check bit packets as ordinary packets, while the error detector 406 determines whether the demodulated packets are faulty. If the retransmitted check bit packets are faulty, each of the receive stations 40A–40C repeats the above procedure for packet retransmission. Upon receipt of error-free check bit packets, an error correction decoder 412 retrieves the previously received packets from the buffer 408 and, after removing errors, applies them to a terminal 414.

As described above, the second embodiment, like the first embodiment, detects repeat request signals using a method which relies on a filter bank and detection of energy. Hence, it allows repeat request signals to be correctly detected even if they are in a conflict. Another advantage attainable with the second embodiment is that what is requied is not sending a repeat request signal for each packet but simply sending information indicative of the total number of failed packets, cutting down the number of frequencies necessary for retransmission request.

While the first and second embodiments have been shown and described as adding error detection codes to each packet, the error detection codes may be replaced with error correction codes.

THIRD AND FOURTH EMBODIMENTS

The principle which underlies a third and a fourth embodiments will be described first. Utilizing the fact that signals to be transmitted are repeat request signals, each of the third and fourth embodiments makes it possible for a plurality of receive stations to accurately deliver repeat request information to a transmit station even if the repeat request signals conflict each other. Where a number assigned to a faulty packet is simply coded and transmitted, a transmit station cannot correctly recognize packet numbers when the packet numbers are in a conflict. In accordance with the third and fourth embodiments, time slots equal in number to packets are set up so that burst signals may be sent from receive stations to a transmit station in the time slots which correspond to informations associated with faulty packets.

In a situation where packet numbers are adopted as informations associated with packets, some burst signal will be observed in a time slot associated with a particular number of a packet which has been received with an error by more than one receive stations even if undergone interference, while no signal will be observed in a time slot associated with a number of a packet which has been correctly received by all the receive stations. Hence, repeat requests from all the receive stations will be fulfilled if a transmit station observes received energy in each time slot and retransmits only those packets having numbers in which energy greater than a predetermined level has been observed.

The packet-by-packet retransmission of repeat request signals effected by each receive station as described above is not limitative. Alternatively, an arrangement may be made such that while each receive station sends back a repeat request signal associated with the total number of faulty packets as information on packets which have been received with errors, a transmit station retransmits packets which correspond in number to the faulty packets in the form of check bits provided by error-correction-coding data signals. In this case, each receive station discards faulty packets and decodes information using retransmitted check packets, eliminating the need for the transmit station to know which packets are faulty. Such will realize efficient transmission of repeat request signals as in the previously stated procedure, if numbers of faulty packets are matched to time slots.

The third embodiment of the present invention will be described in detail. Again, assume that a relatively long message such as a facsimile signal is transmitted in a plurality of discrete packets.

In a transmitter 50, information applied to an input terminal 502 is once stored in a buffer 504. A coder 506 adds error detection codes to the information which is sequentially read out of the buffer 504. A modem 508 modulates an output of the coder 506 to transmit it through an antenna 510.

Receive stations 60A–60C receive the above information at the same time. Since the receive stations 60A–60C are identical in construction, only the operation of the receive station 50A will be described in detail. As packets are received through an antenna 602, they are demodulated by a modem 604 and then checked for error packet by packet by an error detector 606. The received packets are stored in a buffer 608. At the same time, results of decision indicative of whether the respective packets have been correctly received are applied sequentially from the error detector 606 to a shift register 610. When all the packets have been received, information on the packets concerning errors have been stored in the shift register 610. Assuming that N packets are received, the shift register 610 has N shift stages. Based on the content of the shift register 610, the receive station 60A generates a repeat request signal. Specifically, a gate circuit 612 gates an output of an oscillator 614 responsive to the content of the shift register 610. An example of outputs of the gate circuit 612 is shown in R60a of FIG. 7.

Figure 7:
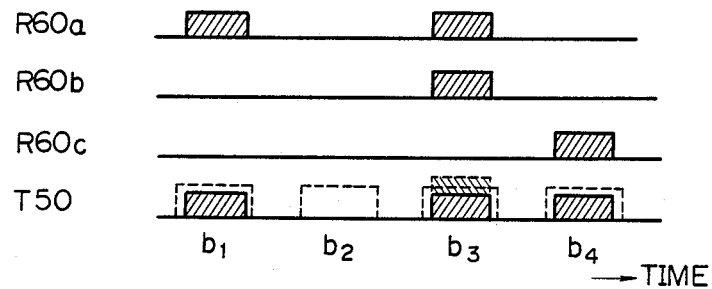
FIG. 7 shows burst positions of repeat request signals in accordance with the embodiment of FIG. 6.

Assume that four packets have been received, i.e., $N=4$, and that an error has been detected in the first and third packets in the receive station 60A, in the third packet in the receive station 60B, and in the fourth packet in the receive station 60C. Shown in FIG. 7 are signals sent from the receive stations 60A–60C as repeat request signals and their positional relationship in a communication link. In FIG. 7, positions $b_1$, $b_2$, $b_3$ and $b_4$ on the time axis are the burst positions assigned to repeat request signals which are associated with the first, second, third and fourth packets, respectively. In the above embodiment, the receive stations 60A–60C send repeat request signals in the time slots as shown in R60a–R60c of FIG. 7, respectively. The intervals between burst positions are directed to absorbing delay differences between the receive stations 60A–60C.

The transmit station 50 receives a signal T50 shown in FIG. 7 through an antenna 510. The received signal is demodulated by the modem 508 and then applied to a window circuit 512. The outputs of the window circuit 512 are sequentially detected by a detector 514 and then checked by a decision circuit 516 as to whether their energy is as high as a predetermined level. The results of decision are sequentially loaded in a shift register 518. The received signal is shown in T50 of FIG. 7; it will be seen that the first, third and fourth packets are faulty. In the transmitter 50, a gate circuit 522 gates outputs of a packet counter 520 responsive to the content of the shift register 518, thereby retransmitting only the requested packets. Meanwhile, each receive station checks only associated ones of the retransmitted packets and, if any one of them is faulty, sends another repeat request signal to the transmit station 50. In this manner, all the informations are transmitted from the transmit station 50 to the receive stations 60A–60C.

Figure 9:
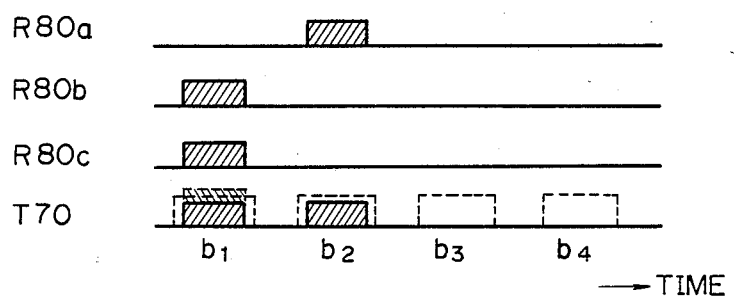
FIG. 9 shows burst positions of repeat request signals in accordance with the embodiment of FIG. 8.
Figure 8:
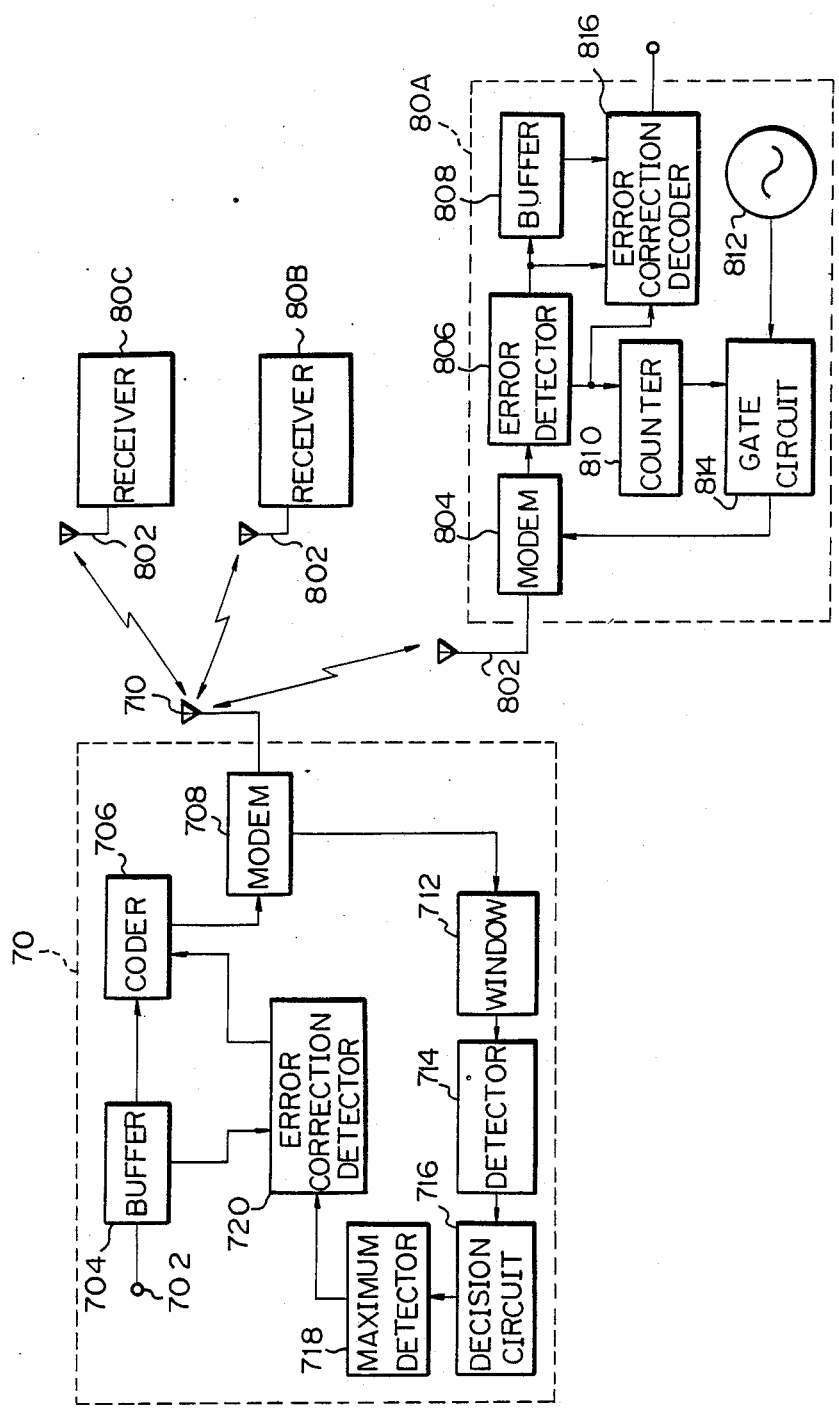
FIG. 8 is a block diagram showing a fourth embodiment of the present invention.

Referring to FIGS. 8 and 9, the fourth embodiment of the present invention is shown. In a transmitter 70, information entered through an input terminal 702 is once stored in a buffer 704. The information is sequentially read out of the buffer 704, while a modem 708 adds error detection codes to the information. The output of the modem 708 is transmitted through an antenna 710.

Receivers 80A–80C receive the above information at the same time. Since the receivers 80A–80C are constructed in exactly the same manner, the operation will be described taking the receiver 80A for example. Packets coming in through an antenna 802 are demodulated by a modem 804 and then checked for errors packet by packet by an error detector 806. The received packets are stored in a buffer 808. At the same time, results of decision showing whether the respective packets have been correctly received are applied from the error detector 806 to a counter 810, which then couns faulty packets. In this particular embodiment, after all the packets have been received, the content of the counter 810, i.e., the number of faulty packets is returned to the transmit station 70 as information. A gate circuit 814 gates an output of an oscillator 812 only in those time slots which are each associated with the content of the counter 810. The outputs of the gate circuit 814 are modulated and then sent back to the transmitter 70. Assuming that the same errors as in the third embodiment have been developed in the respective receivers 80A-80C, repeat request signals will be sent from the receivers as shown in FIG. 9. In FIG. 9, the time slots $b_1$, $b_2$, $b_3$ and $b_4$ represent respectively the burst positions which are assigned to repeat request signals associated with one faulty packet, two faulty packets, three faulty packets and four faulty packets.

The signals received by the transmitter 70 are demodulated by the modem 708 and then applied to a window circuit 712 which is adapted to produce signals appearing at the burst positions $b_1$, $b_2$, $b_3$ and $b_4$ only. The outputs of the window circuit 712 are sequentially detected by a detector 714 whose outputs are applied to a decision circuit 716. This circuit 716 determines if the energy of each detector output is as high as a predetermined level. The results of decision are stored in a maximum detector 718 which is adapted to store a particular burst position where a burst signal above a predetermined level has appeared last. In this manner, the largest number of packets which were erroneously received by the receivers is reported to the transmitter 70. The transmitter 70 retransmits packets which correspond in number to the largest packet number after applying error correction coding to the content of the buffer 704. Specifically, an error correction coder 720 responsive to the output of the maximum detector 718 manipulates the information stored in the buffer 704 for error correction coding and sends the redundant bits as packets. The number of the redundant packets corresponds to the faulty packets which were received by the receivers 80A-80C. As previously stated in relation to the second embodiment, an example of such a technique is described in John J. Metzner "An improved Broadcast Retransmission Protocol", IEEE Transaction of Communications, Vol. COM-32, No. 6, June 1984, pages 679-683. The output of the error correction coder 720 is applied to the coder 706 which then adds error detection codes to the input. The output of the coder 706 in turn is modulated by the modem 708 to be transmitted. In the receiver 80A, the check bit packets from the transmitter 70, like ordinary packets, are demodulated by the modem 804 and then checked for error by the error detector 806. If any of the retransmitted check bit packets is faulty, each receiver 80A-80C repeats the above procedure to send another repeat requst to the transmitter 70. If the check bit packets are error-free, an error correction decoder 816 retrieves the previously received packets from the buffer 808 and, after readout error correction, applies them to a terminal 818. The procedure described so far is repeated to retransmit packets.

FIFTH EMBODIMENT

Figure 10:
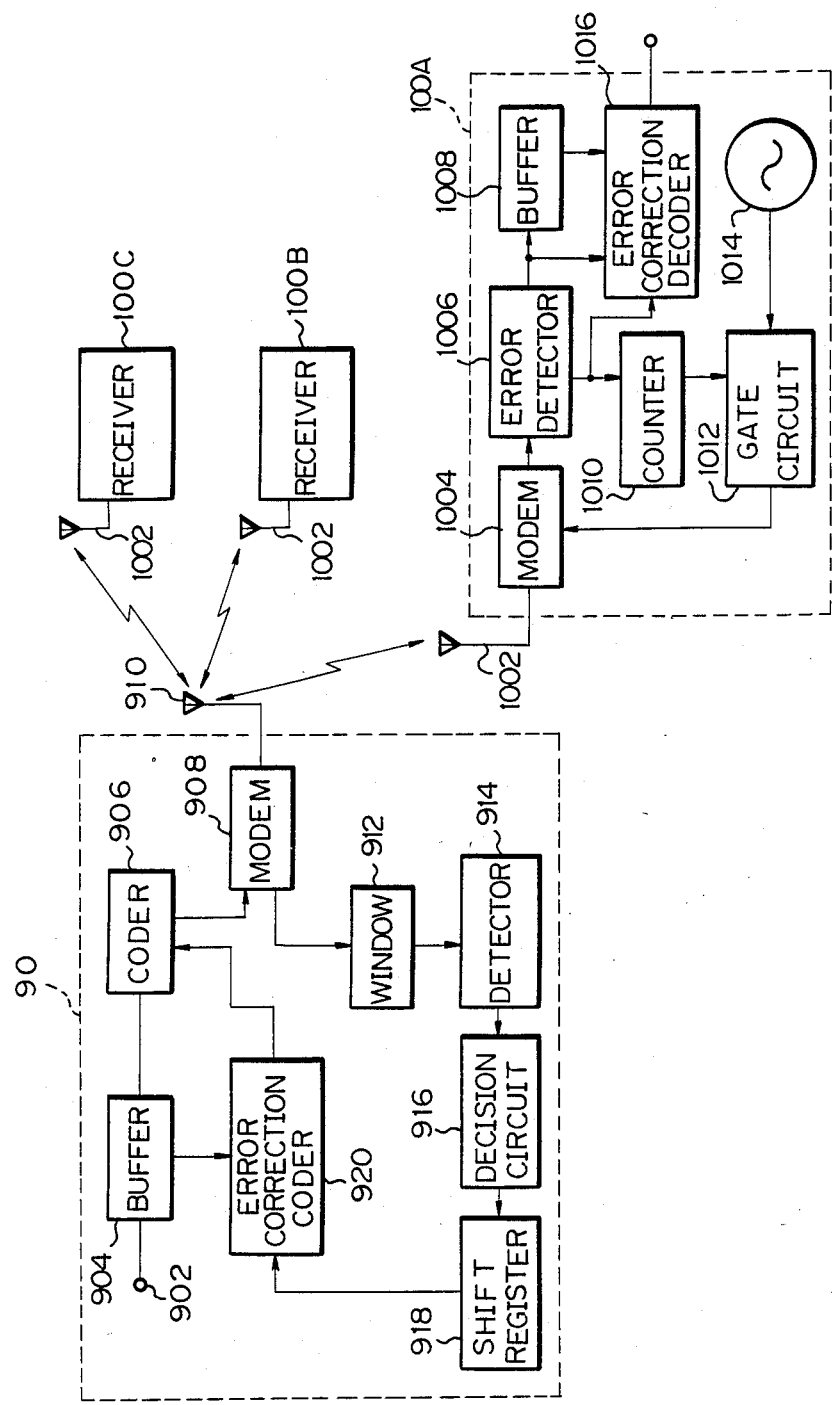
FIG. 10 is a block diagram of a fifth embodiment of the present invention.
Figure 11:
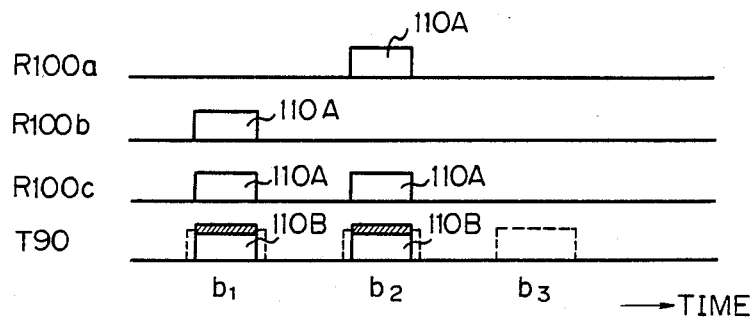
FIG. 11 shows signals sent back from receive stations and their positional relationship in a communication link.
Figure 12:
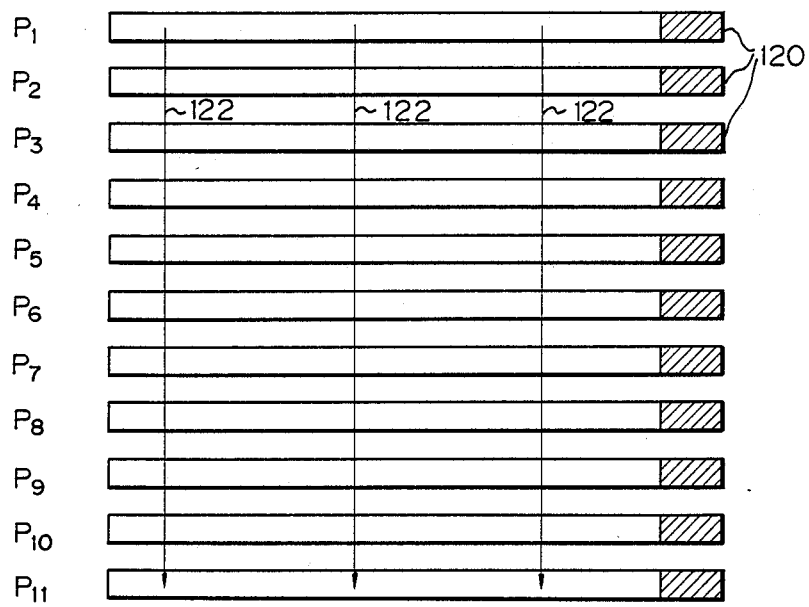
FIG. 12 shows a relationship between packets and check packets.

Referring to FIGS. 10-12, a fifth embodiment of the present invention is shown. In a transmit station 90, information applied to an input terminal 902 is stored in a buffer 904. A coder 906 adds error detection codes packet by packet to the information which is sequentially read out of the buffer 904. A modem 908 modulates an output of the coder 906 to transmit it through an antenna 910 to each of receive stations 100A-100C.

Each of the receive stations 100A-100C receives the signal from the transmit station 90 through an antenna 1002. The signal is demodulated by a modem 1004, then checked by an error detector 1006 for error packet by packet, and then stored in a buffer 1008 on a packet basis. At the same time, resuls of decision made by the error detector 100 as to whether the respective packets have been correctly received are applied to a counter 1010. Specifically, the counter 1010 counts faulty packets using binary codes. The content of the counter 1010 is fed to a gate circuit 1012. Also fed to the gate circuit 1012 is an output of an oscillator 1014. In this condition, the gate circuit 1012 is abled and disabled depending upon information of each bit associated with the content of the counter 1010; when abled, the gate circuit 1012 delivers the oscillator output to the modem 1004. That is, the gate circuit 1012 functions to control the output of the oscillator 1014 responsive to an output of the counter 1010 so that information associated with the content of the counter 1010 is sent to the transmit station 90. In this particular embodiment, the transmission of such information from the receive station 100A is effected after the reception of all the predetermined number of packets. This allows the number of faulty packets which are held in a binary code in the counter 1010 to be sent as information to the transmit station 90. This signal returned to the station 90 is the repeat request signal. The reference numeral 1016 designates an error correction decoder installed in the receiver station 100A.

The transmit station 90 includes a window circuit 912, a detector 914, a decision circuit 916, a shift register 918, and an error correction coder 920. As will be described later in detail, these circuits 912, 914, 916, 918 and 920 serve to process repeat request signals from the stations 100A, 100B and 100C to retransmit necessary check packets.

Assume that eight packets have been transmitted from the transmit station 90 to the receive stations 100A-100C, and that two packets have been found faulty at the receive station 100A, one packet has been found faulty at the receive station 100B, and three packets have been found faulty at the receive station 100C. Shown in FIG. 11 are repeat request signals generated by the respective receive stations under the above condition and their positional relationship in a communication link. In FIG. 11, a symbol 110A indicates bursts, or repeat request signals, while a symbol 110B indicates conflicts of the bursts each occurring in the same time slot. Also, a symbol $b_1$ designates a least significant bit (LSB), a symbol $b_2$ a second bit from the last, and $b_3$ a most significant bit (MSB). These bits each represent a particular time slot in which a burst constituting a repeat request signal in a binary code is generated. The time intervals between the nearby bursts 110A are directed to absorbing delay differences between the receive stations 100A, 100B and 100C. In this particular example, a conflict 110B of the bursts from the receive stations 100B and 100C occurs at the position $b_1$, while a conflict 110B of the bursts from the receive stations 100A and 100C occurs at the position $b_2$. At the position $b_3$, no signal and, therefore, no conflict occurs. The repeat request signals from the receive stations 100A–100C are each generated by the previously stated counter 1010, gate circuit 1012, oscillator 1014 and modem 1004.

The bursts 110A or their conflicts 110B are received by the transmit station 90 through the antenna 910. The received signals are demodulated by the modem 908 and then applied to the window circuit 912 which functions to produe only the signals appearing at the burst positions $b_1$, $b_2$ and $b_3$. The outpus of the window circuit 912 are sequentially detected by the detector 914 and then checked by the decision circuit 916 as to whether their energy is as high as a predetermined level. The results of decision made by the circuit 916 are sequentially loaded in the shift register 918. As the respective receive stations 100A–100B receive eight packets tansmitted from the transmit station 90 and, thereafter, send back to the station 90 repeat request signals associated with the numbers of packets which have been found faulty at the respective receive stations as discussed above, the transmit station 90 determines the largest one of the numbers of faulty packets received by the receive stations 200A–100C utilizing the bursts or the conflicts thereof in the communication link.

Thereafter, in the transmit station 90, the error correction coder 920 subjects the information stored in the buffer 904 to error correction coding responsive to outputs of the shift register 918, the resulting redundant bits being retransmitted as check packets. The number of the retransmitted check packets corresponds to the largest one of the numbers of faulty packets which were received by the receivers. The coder 906 adds error detection codes to the output of the error correction coder 920, while the modem 908 demodulates the output of the coder 906 to transmit it through the antenna 910. Each of the receive stations 100A–100B receives the three check packets retransmitted from the station 90 and, using the check packets, causes the error correction decoder 1016 to correct faulty packets stored in the buffer 1008.

A practical example is shown in FIG. 12. In FIG. 12, $P_1-P_4$ designate eight packets which have been transmitted before the retransmission procedure. Each packet includes check bits for error detection, as indicated by a hatching 120. The error correction coder 920 in the transmit station 90 reads the previously transmitted packets $P_1-P_8$ out of the buffer 904 and codes them as indicated by arrows 122 in FIG. 12 to provide error correction codes. This produces thee different check packets $P_9-P_{11}$. Data stored in the packets $P_9-P_{11}$ serve as check bits for the positionally corresponding bits of the packets $P_1-P_{11}$. As each receive station receives the packets $P_9-P_{11}$, it corrects the previously received faulty packets using them.

As described above, in accordance with this particular embodiment, the transmit station 90 does not have to know which packet or packets have failed at each receive station and need only to know how many packets have failed at the maximum at the receive stations. When the retransmitted check packets $P_9-P_{11}$ have failed, the receive stations 100A–100C repeat the above retransmission procedure to request another retransmission of packets. While various approaches are available for implementing error correction codes, details thereof will not be described herein. Again, the error detection codes which are added to the packets may be replaced with error correction codes.

Further, assuming that all packets received by the receive station 100C are error-free, energy of the bursts 110A are sensed at the two positions $b_1$ and $b_2$ despite that the largest number of packets errors is two. In this situation, three packets including one needless packet will be retransmitted from the transmit station 90. The resulting loss, however, is considered negligible in view of the possible failure of retransmitted packets. In the above embodiment, where the number of faulty packets is sent back in a binary code, failure of N packets can be settled by sending only Log N bits of information at most.

In summary, it will be seen that the present invention provides a repeat request signal transmission method which promotes simple and efficient transmission of repeat request signals due to the use of frequencies or time slots associated respectively with informations on faulty packets as information for requesting a retransmission.

Furthermore, even if repeat request signals from a plurality of receive stations conflict with each other, a transmit station can surely be supplied with at least the information on the largest number of packet errors which is necessary for error correction. This realizes an efficient repeat requst signal transmitting method which enhances simplicity of control, cuts down time losses, and provides informations with unprecedented accuracy.

Various modifications will become possible for those skilled in the art after receiving the teachings of the present disclosure without departing from the scope thereof.

What is claimed is:

1. A repeat request signal transmitting method for use in a multi-station packet communication system, in which a same message is transmitted in packet form from a single transmitting station to each of a plurality of receive stations in a multi-access environment, said method comprising the steps of:
   at each receive station, checking received packets for errors and sending back to the transmitting station repeat request signals, each repeat request signal comprising a frequency component which is determined at the receive station in response to packets found to be erroneous, the frequency of said components being based on a predetermined rule followed in the receive station and recognized in a transmitting station; and
   at a transmitting station, sensing said respective frequency component of the said repeat request signal that is sent back from the receive station, comparing the energy level of the repeat request signal that is sent back from the receive station with a predetermined energy value, each of said frequency components being sensed to require a packet to be retransmitted if the received energy level is greater than said predetermined value, and determining which packets are to be retransmitted in the response to the received frequency components based on the said predetermined rule.

2. A repeat request signal transmitting method as claimed in claim 1, wherein the predetermined rule is that each frequency component corresponds to a packet, hence the receiving stations transmit frequency components corresponding to erroneous packets and the transmitting station determine which packets to retransmit by selecting packets corresponding to the received frequency components in response to the energy level of the packet.

3. A repeat request signal transmitting method as claimed in claim 1, wherein the predetermined rule is that each frequency component corresponds to the number of an erroneous packet, hence the receiving station transmits a frequency component corresponding to the number of the erroneous packets, and the transmitting station determines how many correction packets are to be retransmitted in response to a frequency component, the number of erroneous packets corresponding to the maximum number indicated by the received frequencies.

4. A repeat request signal transmitting method as claimed in claim 1, wherein the predetermined rule is that each time slot corresponds to each packet, hence the receiving station transmits signal bursts in time slots corresponding to erroneous packets and the transmitting station determines which packets are to be retransmitted by selecting packets corresponding to the received time slots.

5. A repeat request signal transmitting method as claimed in claim 1, wherein the predetermined rule is that each time slot corresponds to the number of erroneous packets, hence the receiving station transmit a signal burst in a time slot corresponding to the number of erroneous packets, and the transmitting station determines how many correction packets are to be retransmitted by identifying the received time slot, the number of erroneous packets corresponding to the maximum number indicated by the received time slots.

6. A repeat request signal transmitting method for a multi-station packet communication system in which a single transmit station transmits a same message in a packet format to a plurality of receive stations in a multi-access environment, said method comprising the steps of:

at each receive station, checking received packets for error and sending back to the transmitting station a repeat request signal identifying erroneous packets, said repeat request signal comprising signal bursts appearing in particular time slots which are determined from the erroneous packets based on a predetermined rule followed by said receive station and recognized in a transmitting station: and at a transmitting station, sensing respective ones of said signal bursts in each time slot of said repeat request signals sent back by said receive station by comparing the received energy level of said signals with a predetermined value, each time slot being sensed to be a received repeat request signal if the received energy level is greater than said predetermined value and determining which of the packets is to be retransmitted in reponse to the time slots of the received signal, based on said predetermined rule.

7. A repeat request signal transmitting method for a multi-station packet communication system in which a signal transmit station transmits a same message in a packet form to a plurality of receive stations in a multi-access environment, said method comprising the steps of:

at each receive station, checking received packets for errors and sending back to the transmitting station repeat request signals comprising signal bursts appearing in particular time slots which are determined by encoding the number of erroneous packets into a binary code, each digit of which binary code corresponds to a time slot; and packet communication system in which a single transmit station transmits a same message to a plurality of receive stations in a multi-access environment, said method comprising the steps of:

at a transmitting station, sensing respective ones of the signal burst in each time slot of said repeat request signal by comparing the received energy level with a predetermined value, each time slot being sensed as having been received if its received energy level is greater than said predetermined value, and determining the number of correction packets which are to be retransmitted by decoding the digits obtained from the received time slots.

* * * * *